United States Patent
Connor et al.

(10) Patent No.: US 12,060,158 B2
(45) Date of Patent: Aug. 13, 2024

(54) SYSTEMS AND METHODS FOR AUTOMATION OF COCKPIT SWITCHES

(71) Applicant: Lockheed Martin Corporation, Bethesda, MD (US)

(72) Inventors: Michael A. Connor, New Haven, CT (US); Jesse Elia Morzel, New Haven, CT (US); Marc A. Antonetz, Orange, CT (US); Igor Cherepinsky, Sandy Hook, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 319 days.

(21) Appl. No.: 17/577,878

(22) Filed: Jan. 18, 2022

(65) Prior Publication Data

US 2023/0227173 A1 Jul. 20, 2023

(51) Int. Cl.
*B64D 43/00* (2006.01)
*H01H 47/22* (2006.01)

(52) U.S. Cl.
CPC ........... *B64D 43/00* (2013.01); *H01H 47/226* (2013.01)

(58) Field of Classification Search
CPC .............................. B64D 43/00; H01H 47/226
USPC ........................................................ 361/160
See application file for complete search history.

(56) References Cited

U.S. PATENT DOCUMENTS

| | | | |
|---|---|---|---|
| 3,376,428 A | 4/1968 | Nugent | |
| 4,091,273 A * | 5/1978 | Fuller | F41G 3/225 398/106 |
| 4,600,966 A | 7/1986 | Mueller et al. | |
| 9,415,862 B2 | 8/2016 | Golborne et al. | |
| 10,730,609 B2 * | 8/2020 | Baran | B64C 27/68 |
| 10,850,397 B2 * | 12/2020 | Bosworth | B25J 5/02 |
| 11,097,834 B2 * | 8/2021 | Wilkens | G06F 13/4004 |
| 2018/0005789 A1 | 1/2018 | Kim et al. | |
| 2018/0290729 A1 | 10/2018 | Shavit | |
| 2019/0047715 A1 * | 2/2019 | Hedrick | G08G 5/04 |
| 2019/0375514 A1 | 12/2019 | Lampazzi et al. | |

FOREIGN PATENT DOCUMENTS

WO    WO-2013/099102 A1    7/2023

OTHER PUBLICATIONS

Extended European Search Report on European Patent Application No. 23150274.1 dated Jun. 9, 2023 (7 pages).

* cited by examiner

*Primary Examiner* — Yemane Mehari
(74) *Attorney, Agent, or Firm* — Foley & Lardner LLP

(57) ABSTRACT

A cockpit switch device can include a pushbutton switch, a bi-stable relay and a toggle component. The pushbutton switch can be configured to be manually actuated by a user into a command state. The bi-stable relay can be controlled by input commands from the pushbutton switch and input commands from a processor, and can be configured to control operation of one or more systems of an aircraft. The toggle component can be connected to the pushbutton switch, the processor and the bi-stable relay. The toggle component can receive an input command signal from at least one of the pushbutton switch or the processor, and cause a state of the bi-stable relay to be flipped responsive to the input command signal from the at least one of the pushbutton switch or the processor.

17 Claims, 8 Drawing Sheets

SYSTEMS AND METHODS FOR AUTOMATION OF COCKPIT SWITCHES

TECHNICAL FIELD

The disclosure relates to systems and methods for automating aircraft switches, such as cockpit switches, by replacing an electro-mechanical pushbutton switch with an electro-mechanical assembly controllable by input command signals received from at least one of a mission processor (also referred to herein as a vehicle management computer VMC) or from a momentary pushdown switch that is actuated by a user.

BACKGROUND

Legacy aircraft cockpits include many electromechanical pushbutton switches that are user-activated and provide feedback through illumination and/or switch position. These switches may be momentary or alternate action and can control the operation state of one or more. Each switch has an electrical contact that may interface with a variety of aircraft systems. In order to enable optionally piloted vehicle (OPV) capabilities or workload reductions necessary for single pilot operation (SPO), there is a need for automating the operation of most or all of these switches by a vehicle management system.

Conventional automation methods for aircraft pushbutton switches utilize a fly-by-wire configuration approach, where the pilot operated switches interface with a computer that directly manages the electrical switch states of the aircraft systems. These configurations require invasive modification to the aircraft subsystem schematics, necessitating extensive functional and safety analysis of each change to the affected systems.

Modern fleets of aircraft cockpits are being converted to include autonomous features that often require highly invasive systems, new switches, new wiring, and data converters. The work involved with replacing legacy cockpits can make conversion and retrofitting cost prohibitive and cumbersome.

Furthermore, with the conversion, a pilot would be able to manually override the automated state of the switch. In order for rapid integration of OPV or SPO kits onto legacy aircraft cockpit designs, a need exists for a method of automating switches that is agnostic to the aircraft systems managed by each switch. Therefore, a need exists for automating switches that does not allow for the introduction of new failure modes within the aircraft systems.

SUMMARY

According to at least one aspect, a cockpit switch device can include a pushbutton switch, a bi-stable relay and a toggle component. The pushbutton switch can be configured to be manually actuated by a user into a command state. The bi-stable relay can be controlled by input commands from the pushbutton switch and input commands from a processor, and can be configured to control operation of one or more systems of an a aircraft. The toggle component can be connected to the pushbutton switch, the processor and the bi-stable relay. The toggle component can receive an input command signal from at least one of the pushbutton switch or the processor, and cause a state of the bi-stable relay to be flipped responsive to the input command signal from the at least one of the pushbutton switch or the processor.

In some implementations, the pushbutton switch can be a momentary pushbutton switch. The pushbutton switch can include a mechanical switch structured to: switch to a closed position when the pushbutton switch is actuated by the user, and switch back to an open position when the pushbutton switch is released by the user.

In some implementations, the bi-stable relay can be a first bi-stable relay and the toggle component can includes a non-latching relay and a second bi-stable relay. The non-latching relay can receive the input command signal from the at least one of the pushbutton switch or the processor, and cause a state of the second bi-stable relay to be flipped responsive to the input command signal from the at least one of the pushbutton switch or the processor. The second bi-stable relay can include one or more inductors. The non-latching relay can cause the state of the second bi-stable relay to be flipped by energizing the one or more inductors of the second bi-stable relay. The command signal can be a first command signal and the first bi-stable relay can include a pair of inductors. The second bi-stable relay can cause the state of the first bi-stable relay to be flipped by energizing a first inductor of the first bi-stable relay that is different than a second inductor of the first bi-stable relay that was previously energized responsive to a second command signal preceding the first command signal. The state of the second bi-stable relay does not change responsive to a failure or a power loss.

In some implementations, the state of the bi-stable relay does not change responsive to a failure or a power loss. The bi-stable relay can include a four-pole double throw switch. The bi-stable relay can transmit a feedback signal indicative of the state of the bi-stable relay to the processor.

According to at least one aspect, a method can include receiving, by a toggle component connected to a pushbutton switch, a processor and a bi-stable relay, an input command signal from at least one of the pushbutton switch or the processor. The method can include causing, by the toggle component, a state of the bi-stable relay to be flipped responsive to the input command signal from the at least one of the pushbutton switch or the processor. The method can include maintaining, by the bi-stable relay, the state of the bi-stable relay until a subsequent input command signal is received by the toggle component from the at least one of the pushbutton switch or the processor. The bi-stable relay can control operation of one or more systems of an aircraft.

In some implementations, the method can further include switching, by the pushbutton switch, to a closed position when the pushbutton switch is actuated by a user, and switching back, by the pushbutton switch, to an open position when the pushbutton switch is released by the user.

In some implementations, the bi-stable relay can be a first bi-stable relay and the toggle component can include a non-latching relay and a second bi-stable relay. The method can further include receiving, by the non-latching switch, the input command signal from the at least one of the pushbutton switch or the processor, and causing, by the non-latching switch, a state of the second bi-stable relay to be flipped responsive to the input command signal from the at least one of the pushbutton switch or the processor. The second bi-stable relay can include one or more inductors and causing the state of the second bi-stable relay to be flipped can include energizing the one or more inductors of the second bi-stable relay.

In some implementations, the command signal can be a first command signal and the first bi-stable relay can include a pair of inductors. Causing the state of the first bi-stable relay to be flipped includes energizing a first inductor of the first bi-stable relay that is different from a second inductor of the first bi-stable relay that was previously energized responsive to a second command signal preceding the first command signal. The state of the second bi-stable relay does not change responsive to a failure or a power loss.

In some implementations, the state of the bi-stable relay does not change responsive to a failure or a power loss. The bi-stable relay can include a four-pole double throw switch. The method can further include transmitting, by the bi-stable relay, a feedback signal indicative of the state of the bi-stable relay to the processor.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed systems, devices and methods for automation of aircraft switches is presented herein by way of exemplification and not limitation with reference to the Figures.

Figure 1:
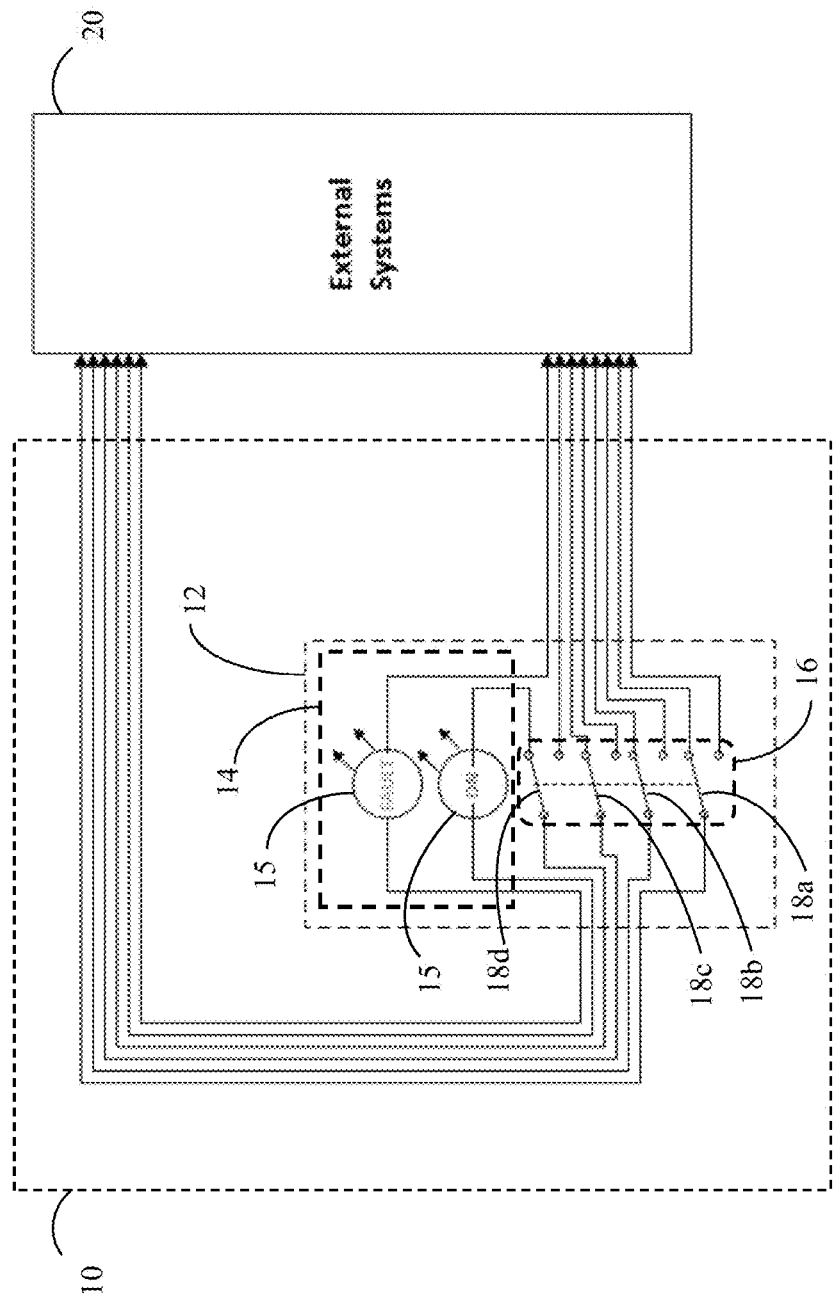
FIG. 1 shows a diagram depicting a conventional pushbutton switch device.

Referring to FIG. 1, a block diagram illustrating a conventional cockpit pushbutton-based switching system 10 of an aircraft is shown. The pushbutton-based switching system 10 (also referred to hereinafter as a switch panel 10) can include a pushbutton switch device 12. In the example shown of FIG. 1, the pushbutton switch device 12 includes a pushbutton 14 and a four-pole double-throw switch 16. The four-pole double-throw switch 14 includes four poles 18 a-18 d, which are referred to hereinafter, either individually or collectively as pole(s) 18. The poles 18 a-18 d are electro-mechanical latch switches. With a four-pole double throw switch 16, four independent circuits can be switched on or off with each throw of the pushbutton switch device 12. In general, the switch 16 can include any number and/or any variety of poles 18. The pushbutton 14 can include one or more lamps 15 to indicate the state of the switch 16.

The switch panel 10 can be connected to external systems 20 of the aircraft. The external systems 20 can depend on the one or more pushbutton switch devices 12 to function. For instance, the pushbutton switch device 12 can be employed to enable or disable functions, operations and/or circuits of the external systems 20. The switch panel 10 may be connected to the external systems 20 via a connector (not shown in FIG. 1). In some implementations, the switch panel 10 can include a plurality of pushbutton switch devices 12, toggle switches, diode blocks and/or other components that are interconnected and that are also connected to the external systems 20. In other words, the switch panel 10 can be more complicated than the example shown in FIG. 1 in terms of the various switches and/or components that may form the switch panel 10 and in terms of the wiring or connections between such switches and/or components.

Retrofitting cockpits calls for aircraft or cockpit switches that allow for automatic as well as manual actuation. However, such retrofit may be costly and may introduce new failure modes of aircraft systems. In the current disclosure, systems and methods for automated or hybrid switches allow for automatic and manual actuation of aircraft or cockpit switches without introducing new failure modes. Also the systems and methods described herein allow for automated or hybrid switch devices that can be integrated in existing cockpit or aircraft switch panels without significant changes in the panels.

Figure 2:
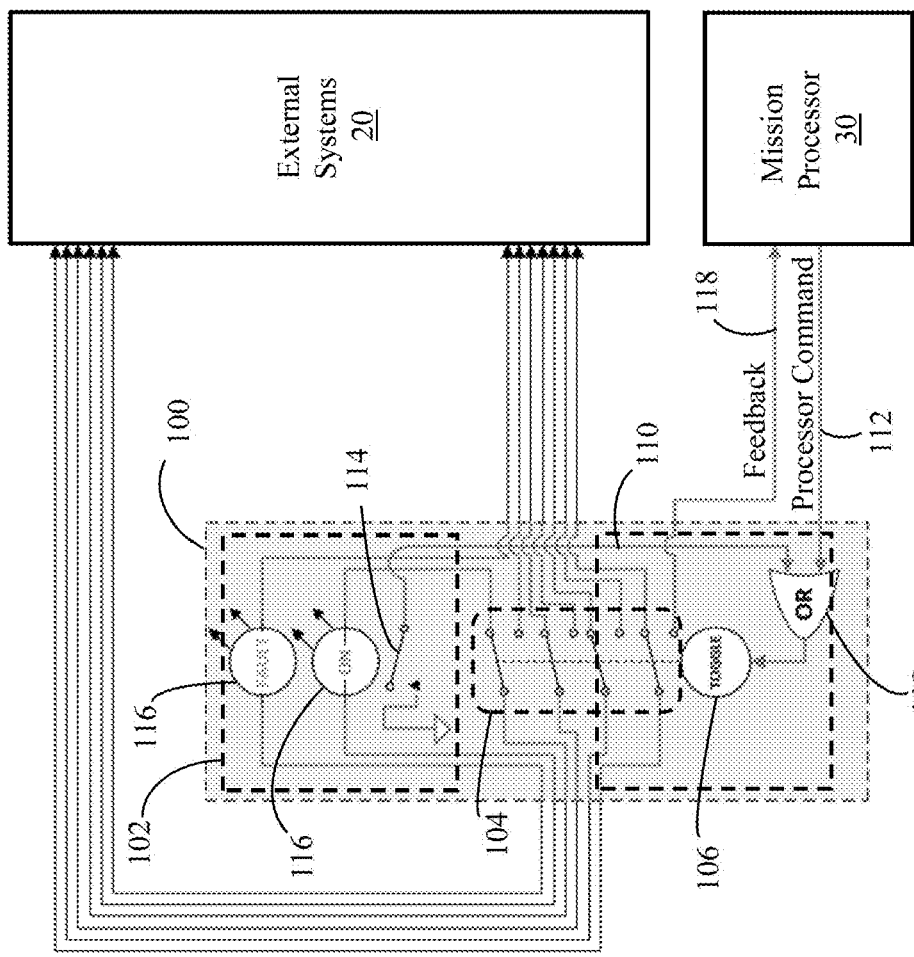
FIG. 2 shows a diagram of an automated or hybrid switch device, in accordance with an exemplary embodiment.

Referring now to FIG. 2, a block diagram of an automated switch device 100 is shown, according to example embodiments. The automated switch device 100 can be used for the automation of cockpit switches. In brief overview, the automated switch device 100 can be an electro-mechanical assembly that comprises a momentary pushbutton switch 102, a primary bi-stable relay 104 and a toggle component 106. The automated switch device 100 can include an OR (or accumulator) component 108 configured to combine the output 110 of the momentary pushbutton switch 102 and a command signal 112 from a mission processor 30 (also referred to as a vehicle management computer). In other words, the primary or bi-stable relay 104 and the toggle component 106 can be controlled by the discrete command 112 from the mission processor 30 or by a manual operation (or the corresponding manual command signal 110 output by the momentary pushbutton switch 102) that is applied by a pilot to the momentary pushbutton switch 102. The automated switch device 100 can be viewed as hybrid switch device since it allows both manual and automatic actuation of the primary or bi-stable relay 104 and the toggle component 106.

The momentary pushbutton switch 110 can include a mechanical switch 114 and one or more lamps 116 to indicate a state of the automated switch device 100 (or of the primary or bi-stable relay 104). The momentary pushbutton switch 110 can be structured to be actuated or engaged by a user or a pilot into a command state. When the pilot or user presses or pushes the pushbutton of the momentary pushbutton switch 102, the mechanical switch 114 goes into a closed state (or normally closed (NC) position). The term momentary means that the command state of the momentary pushbutton switch 102, or that the mechanical switch 114 is in NC position, only when the pushbutton is pressed or pushed. As soon as the pushbutton is released, the mechanical switch 102 goes back to an open state (also referred to as normally open (NO) position). The momentary pushbutton switch 102 can output a manual command signal 110 when the mechanical switch 114 is in close position or when the pushbutton of the momentary pushbutton switch 102 is being pushed.

The mission processor 30 can generate command signals (e.g., pulses) 112 to control or change the state of the automated switch device 100 (or of the bi-stable relay 104). The pushbutton switch 102 can also generate a command signal (e.g., a pulse) responsive to a manual operation (e.g., pushing a corresponding pushbutton by the user or pilot) to change or flip a state of the automated switch device 100 (or of the bi-stable relay 104). The OR component 108 may not necessarily be an OR gate. The OR (or accumulator) component 108 can be any component designed to combine the command signal 110 generated by the pushbutton switch 102 and the command signal 112 generated by the mission processor 30.

The automated (or hybrid) switch device 100 can include a primary or bi-stable relay 104 configured to control the operation of one or more systems 20 of the aircraft. The primary or bi-stable relay 104 replaces the four-pole double throw switch 16 of FIG. 1. However, while the four-pole double throw switch 16 is a manually controlled switch, the primary or bi-stable relay 104 can be controlled manually via the pushbutton switch 102 and/or automatically by the mission processor 30. Each new command from the pushbutton switch 102 and/or from the mission processor 30 causes the state of the primary or bi-stable relay 104 to flip. The primary or bi-stable relay 104 can then maintain its state until the next command (or command signal 110 and/or 112) from the pushbutton switch 102 and/or the mission processor 30. The state of the primary or bi-stable relay 104 would not change even in the case of a failure or power loss. The state of the primary or bi-stable relay 104 will change, however, responsive to a new command from the pushbutton switch 102 and/or the mission processor 30.

The primary or bi-stable relay 104 can include a four-pole double throw switch. When the state of the primary or bi-stable relay 104 is flipped, the positions of all four poles of the four-pole double throw switch change at once. The automated switch device 100 or the primary or bi-stable relay 104 can transmit a feedback signal 118 to the mission processor 30 each time the state of the primary or bi-stable relay 104 flips. The feedback signal 118 allows the mission processor 30 to keep track of or maintain an indication of the current state of the automated switch device 100 or of the primary or bi-stable relay 104. The mission processor 30 can check the current state of the primary or bi-stable relay 104 (or of the automated switch device 100) before sending the command signal 112 to the toggle component 106.

The toggle component 106 can be connected to the pushbutton switch 102, the mission processor 30 and the bi-stable relay 104. The toggle component 106 can receive the input command signal 110 and/or 112 from at least one of the pushbutton switch 102 or the mission processor 30. Specifically, the toggle component 106 can receive an input signal that is a combination of both the command signal 110 and the command signal 112. The toggle component 106 can cause a state of the primary or bi-stable relay 104 to be flipped responsive to the input command signal from the at least one of the pushbutton switch 102 or the mission processor 30. As discussed in further detail below, the toggle component 106 can include a non-latching relay and a second bi-stable relay.

The automated switch device 100, while illustrated in FIG. 2 to include a four-pole double throw switch, the primary or bi-stable relay 104 of the automated or hybrid switch device 100 can be equally adaptable to a 3-pole double throw wherein three independent circuits are switched on or off with each throw (or flip of the state of) primary or bi-stable relay 104. The automated switch module 100 is also equally adaptable to a 2-pole double throw switch wherein two independent circuits can be switched on or off with each throw of the 2-pole double throw switch, or a single-pole double throw wherein one circuit is switched with each throw of the single-pole double throw switch. In general, the automated switch module 100 is adaptable to an N-pole double throw switch where N independent circuits are switched with each throw of the N-pole double throw switch and where N is an integer.

Figure 3:
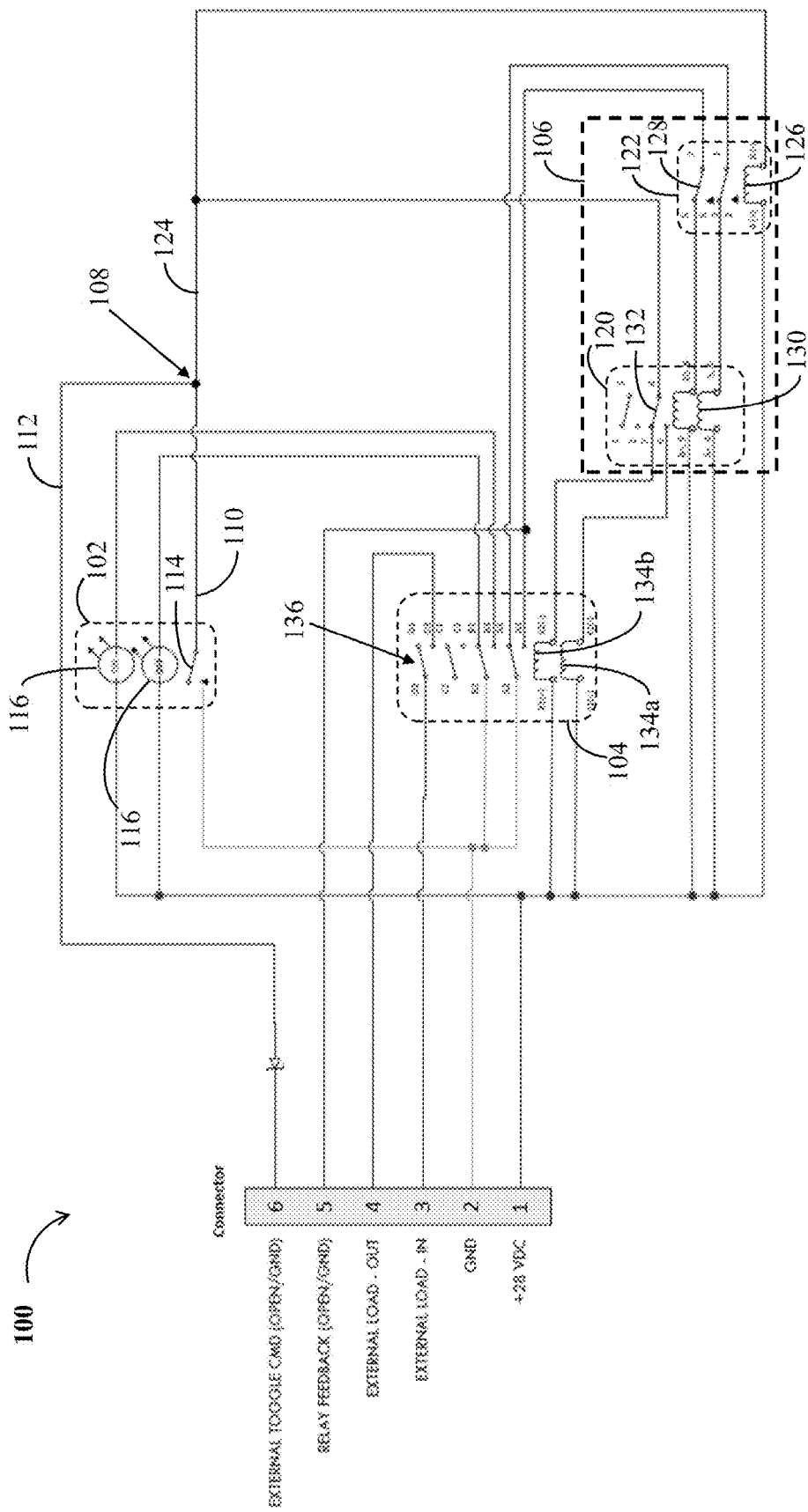
FIG. 3 shows a circuit depicting an example implementation of the automated or hybrid switch device of FIG. 2, in accordance with an example embodiments.

Referring now to FIG. 3, an example circuit implementation of the automated or hybrid switch device 100 is shown, in accordance with example embodiments. When the pushbutton of the momentary pushbutton switch 102 is activated (e.g., pressed) by the user or pilot, the mechanical switch 114 switches to a closed position to connect to the ground (e.g., at port 2 of the connector). While the pushbutton is activated, the mechanical switch 114 stays in closed position and switches back to the open position when the pushbutton is released. The mechanical switch 114 can have a single pole.

The node 108 represents an example implementation of the OR (or accumulator) component 108 of FIG. 2. Specifically, at node 108, the output link of the pushbutton switch 102 (e.g., carrying the output command signal 110) and the link carrying the command signal 112 from the mission processor 30 are joined so that the command signal 124 represents a combination of the command signal 110, if any, output by the pushbutton switch 102 and the command signal 112, if any, output by the mission processor 30. The command signal 124 can be fed as input to the toggle component 106. The toggle component 106 can include a second bi-stable relay 120 and a non-latching switch 122. The command signal 124 can be fed as input to both the non-latching switch 122 and the second bi-stable relay 120. The non-latching relay 122 is also referred to herein as a pulsed relay 122, and the second bi-stable relay 120 is referred to herein as a toggle relay 120. While the relay 122 is non-latching (e.g., to goes back to a predefined position or state once the command is released), both relays 104 and 120 are latching relays (e.g., bi-stable) and they maintain their new state or position until a next input command signal is received.

The non-latching relay 122 can include an inductor 126 and one or more switches 128. The command signal 124 can be fed to the inductor 126. When the command (e.g., a command from the mission processor 30 or the push button switch 102) is active, the inductor 126 causes the one or more switches 128 to be in open state (or open position). The one or more switches 128 return back to a closed state (or closed position) once the command is released. In other words, the one or more one or more switches 128 switch back to the closed state immediately after the command signal 124 is received.

The second bi-stable relay 120 can include one or more inductors 130 connected to the one or more switches 128 of the non-latching relay 122, and a switch 132. When the one or more switches 128 of the non-latching relay 122 are in closed state (or closed position), they cause the one or more inductors 130 of the second bi-stable relay 120 to be energized, which causes the switch 132 of the second bi-stable relay 120 to change its position or its state. The switch 132 of the second bi-stable relay 120 will maintain its state or position till the next command signal 124 is received from the pushbutton switch 102 or the mission processor 30.

The state of the second bi-stable relay will not change even in the case of a failure or power loss. The second bi-stable relay 120 can include a two-pole double throw switch, a single-pole double throw or an N-pole double throw switch.

The primary or bi-stable relay 104 can include a pair of inductor 134a and 134b and a four-pole double throw switch 136. The primary or bi-stable relay 104 may include a single-pole double throw switch, a two-pole double throw switch, a three-pole double throw switch or an N-pole double throw switch. The inductors 134a and 134b can be connected to the switch 132 of the second bi-stable relay 120. The command signal 124 can cause one of the inductors (e.g., inductor 134a) to be energized and cause the switch 132 of the second bi-stable relay 120 to flip its state or position so that when the next command signal is received it causes the other inductor (e.g., inductor 134b) of the primary or bi-stable relay 104 to be energized. In other words, the flipping of the position or state of the switch 132 of the second bi-stable relay 120 leads to alternation between the inductors 134a and 134b so that with each new command signal 124 a different inductor is energized compared to the one energized with the last command signal. If a last command signal 124 received resulted in energizing the inductor 134a, a new command signal 124 will energize the inductor 134b, and next command signal 124 that comes after the new signal will energize the inductor 134a and so on and so forth.

Energizing the inductor 134a causes the four-pole double throw switch 136 to flip to a corresponding position or state (e.g., closed position) and stay at that state or position until the next command signal 124 is received, while energizing the inductor 134b causes the four-pole double throw switch 136 to flip to a different position or state (e.g., open position) and stay at that state or position until the following command signal 124 is received. Therefore, the state of the switch 136 changes with each new command signal and is maintained until the next command signal 124 is received. The state or position of the switch 136 is maintained and does not change even in the case of failure or power loss. The bi-stable relay 120 can change state on the rising edge of the input command signal 124 (discrete command 122 or pilot input). The input command signal can be toggled by the additional relays 120 and 122 such that only one inductor of the bi-stable relay 104 is energized at any given time and the energized inductor is alternated between command signal inputs.

It is to be note that the implementations of the automated (or hybrid) switch device 100 shown in and discussed in relation to FIG. 3 is shown for illustrative purposes and should not be interpreted as limiting. For example, the number of inductors and or the number of switches in each of the relays 104, 120 and/or 122 can be different than what's shown in FIG. 3. Also, other implementations may employ, for example, capacitors instead of inductors or can make use of a combination of inductors and capacitors. In some implementations, the toggle component 106 may be designed and manufactured as a single component or a single circuit.

Figure 4:
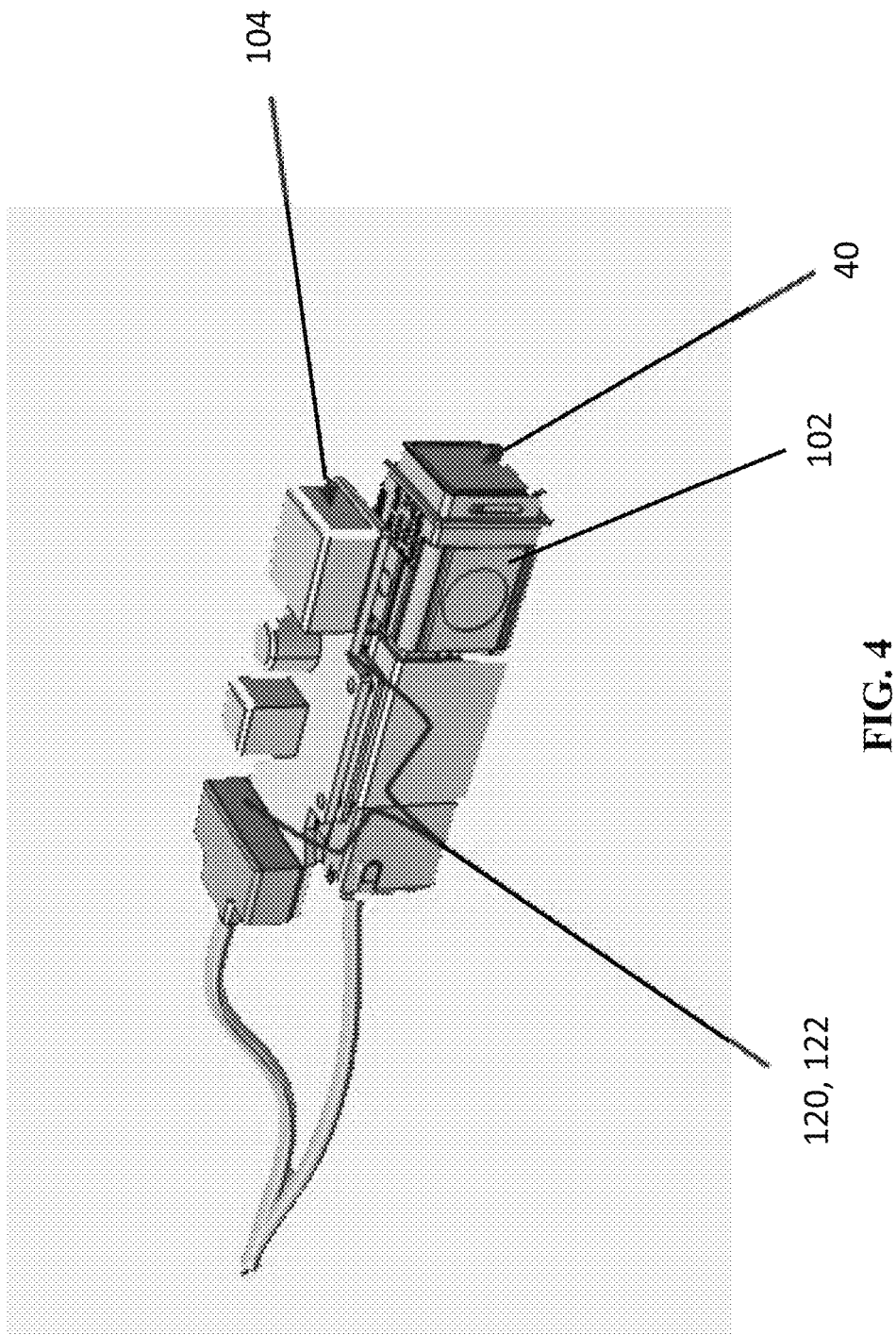
FIG. 4 shows a prototype of automated or hybrid switch device in FIG. 3, in accordance with example embodiments.
Figure 5:
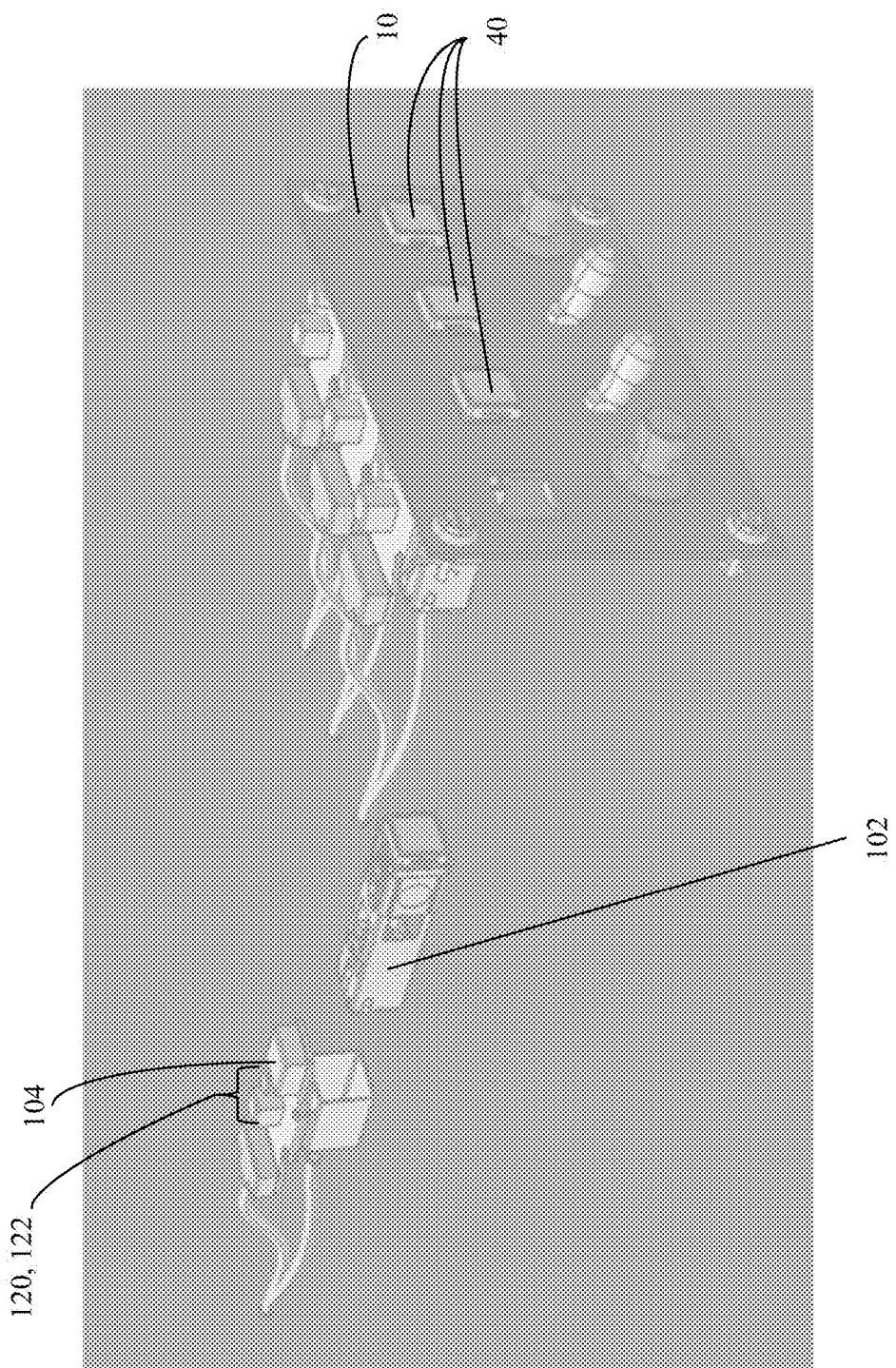
FIG. 5 depicts an elevation expanded view of a switch panel integrating the automated or hybrid switch device of FIG. 4, in accordance with an example embodiments.

Referring now to FIGS. 4 and 5, a prototype of an automated (or hybrid) switch device 100 and a prototype of a switch panel 10 integrating the automated (or hybrid) switch device 100 are shown, according to example embodiments. FIG. 4 shows a prototype of the automated (or hybrid) switch device 100. The relays 104, 120 and 122 can be manufactured as separate components that are connected to the pushbutton switch 102. The pushbutton switch 102 can be manually actuated via the pushbutton 40.

FIG. 5 shows a prototype of a switch panel 10 integrating the automated (or hybrid) switch device 100. The switch panel 10 can include a plurality of switches integrated therein. The switch panel 10 can include a plurality of pushbuttons 40 to manually activate the plurality of switches integrated in the switch panel 10.

The relays 104, 120, 122 may be installed in a compact modular assembly along with or in close proximity to the pushbutton 102, as seen in FIGS. 4 and 5, for example. This allows for installation within a similar physical volume occupied by the conventional pushbutton switch 12 shown in FIG. 1. During installation, contacts from the pushbutton switch 102 can be connected to the relays 120 and 122, which are connected to the primary or bi-stable relay 104. The prototypes shown in FIGS. 4 and 5, depict an efficient upgrade and automation of existing manual cockpit switches that does not require modification to cockpit switch panels.

The modification of existing manual aircraft switch devices 12 to the automated (or hybrid) switch device 100 can occurs at the location of the pushbutton switch 102 behind a panel switch 10, for example, as seen in FIG. 5. With this configuration, once the panel switch 10 has been retrofit to include the automated or hybrid switch device 100, the resulting appearance is aesthetically consistent with a existing systems. As seen in FIG. 5, the automation-enabling components, e.g., the relays 104, 120 and 122, are installed on the side of the pushbutton switch 102 having the most available space. For this retrofitting, the aircraft wire harness from a conventional pushbutton switch (as shown in FIG. 1) is transferred to the primary bi-stable relay (as shown in FIGS. 2 and 3) having identical switch contact specifications.

As shown in FIGS. 6A-6D, the pushbutton switch 102 of the automated (or hybrid) switch device 100 is engaged by a single press operation. The automated (or hybrid) switch device 100 can cause display of visual feedback to the pilot of the state of the automated (or hybrid) switch device 100 via one of the lamps 15. The automated (or hybrid) switch device 100 can also cause display of visual feedback to the pilot indicative of the fault status of the automated (or hybrid) switch device 00 via another lamp of the lamps 15. The visual feedback displayed by the pushbutton 102, as seen in FIGS. 6A-6D, can be similar to that of displayed by existing pushbutton switch devices 12 that the automated (or hybrid) switch device 100 is replacing.

The pushbutton switch 102 can display via the lamps 15 the state of the primary bi-stable relay 104 in the cap of pushbutton 40. The pilot is able to manually toggle the state of the primary bi-stable relay 104 by engaging the pushbutton 40 and lamps 15 keep the pilot aware of the current state and any fault of the automated (or hybrid) switch device 100. The switch device 100 then transmits electrical commands to the aircraft system to perform the selected operation. In the event of power loss or failure, the automated (or hybrid) switch device 100 maintains its last commanded state such that new failure modes are not introduced within the aircraft systems. It is the bi-stable nature of the primary relay 104 and the toggle relay 120 that causes the automated (or hybrid) switch device 100 to remain in the last commanded state. The non-latching relay 122 is activated when the pushbutton switch 102 is actuated or when the processor 30 transmits an automated toggle command 112. With this configuration, the pilot is capable of overriding the automated toggle command 112 provided by the processor 30 by actuating the pushbutton switch 102. The input toggling components 120 122 utilize the momentary inputs from the pilot and/or the processor 30 in order to toggle the state of the bi-stable relay 104.

Figure 6B:
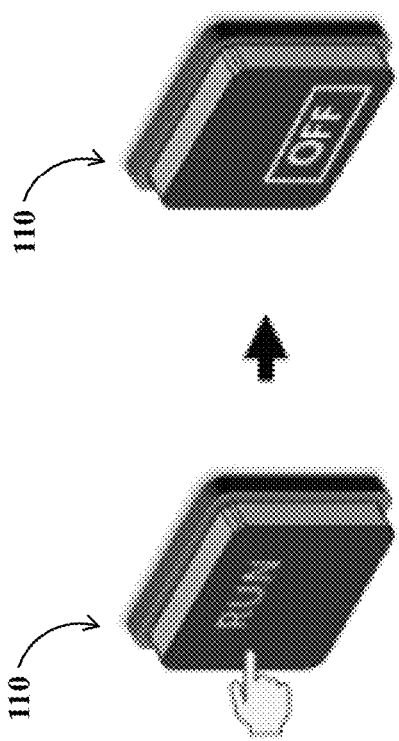
FIGS. 6A and 6B depict automated switch module responses to pilot operations, in accordance with an example embodiments.
Figure 6A:
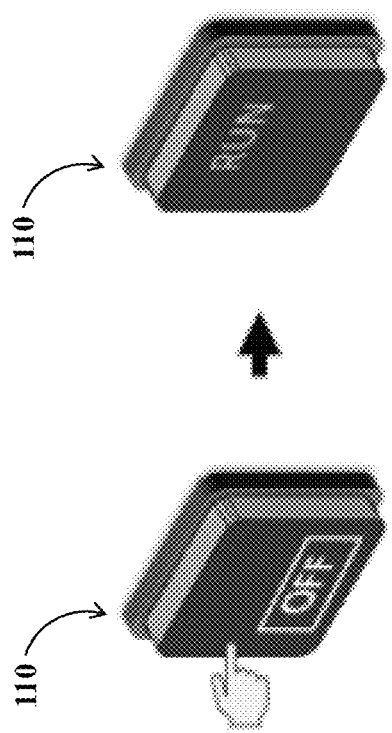

FIGS. 6A and 6B show the state of the automated (or hybrid) switch device 100 in normal pilot operation or when a pilot chooses to override the state of the mission processor selection via a single input. At any time during operation, the pilot may override the command via single press of the momentary pushbutton 40. The automated (or hybrid) switch device 100 does not introduce new failure modes because the bi-stable relay contacts can be wired or connected to the external systems 20 in a similar manner as the contacts of the pushbutton switch device 12 of FIG. 1 such that the bi-stable relay 104 of the automated (or hybrid) switch device 100 replaces the operation of the pushbutton switch device 12.

As shown in FIG. 6A, if the pushbutton 40 communicates (e.g., via lamps 15) that the state of the command is "OFF", then the pilot employs a single press to change or toggle the state from "OFF" to "RUN". Similarly, as shown in FIG. 6B, if the pushbutton 40 communicates that the state of the command is "RUN", then the pilot employs a single press to change or toggle the state from "RUN" to "OFF".

The automated (or hybrid) switch device 100 is operable by either pilot or the mission processor 30. In the instance where the automated (or hybrid) switch device 100 is operated by the mission processor 30, the pilot shall be capable of overriding the processor-commanded state via a single input. The mission processor 30 is capable of detecting pilot override and would then accept the command state selected by the pilot.

Figure 6D:
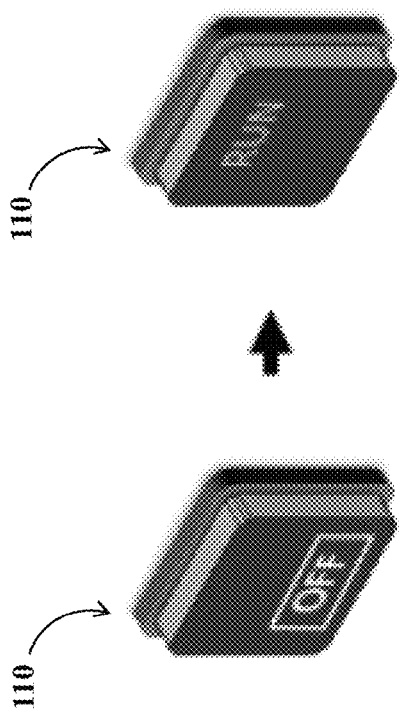
FIGS. 6C and 6D depict automated switch module responses to computer operations, in accordance with an example embodiments.
Figure 6C:
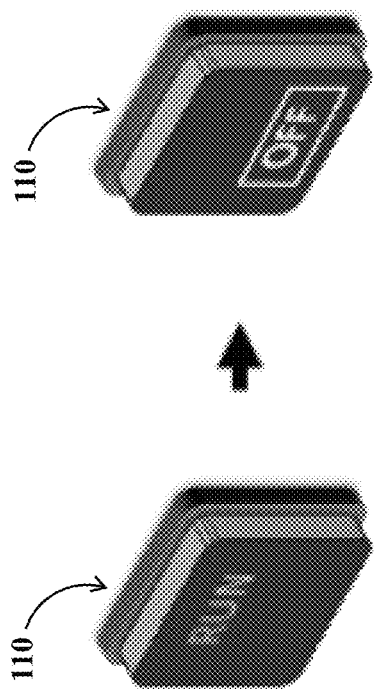

As seen in FIGS. 6C and 6D, the state of the automated (or hybrid) switch device 100 is shown in processor control. A momentary electrical pulse is used to enable and toggle the state of the automated (or hybrid) switch device 100. As shown in FIG. 6C, if the pushbutton 40 communicates that the state of the command is "RUN", then the processor 30 switch control employs a momentary electrical pulse to toggle the state of the automated (or hybrid) switch device 100 from "RUN" to "OFF". Similarly, as shown in FIG. 6D, if the pushbutton 40 communicates that the state of the command is "OFF", then the processor switch control employs a momentary electrical pulse to toggle the electrical state of the automated (or hybrid) switch device 100 from "OFF" to "RUN".

In either instance, the same input (e.g., single pilot press) is required for both normal operation (FIGS. 6A and 6B) and to override the processor command (FIGS. 6C and 6D). In either instance, as the switch panel remains, the pilot can manually operate the pushbutton 40.

Figure 7:
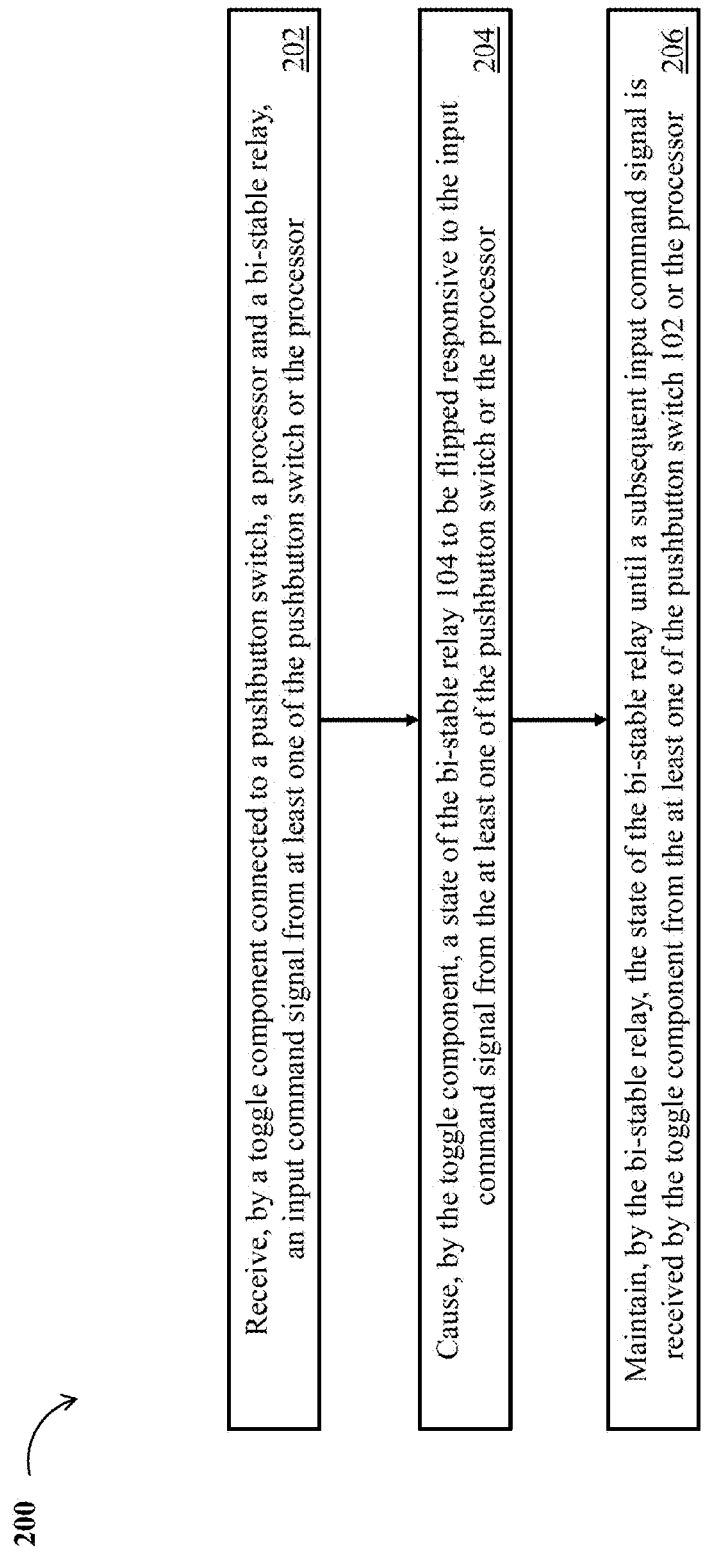
FIG. 7 shows a flowchart depicting a method of automated or hybrid switching, in accordance with example embodiments.

Referring now to FIG. 7, a flowchart illustrating an automated (or hybrid) switching method 200 is shown, in accordance with example embodiments. The method 200 can include receiving, by a toggle component connected to a pushbutton switch, a processor and a bi-stable relay, an input command signal from at least one of the pushbutton switch or the processor (STEP 202). As discussed above with regard to FIGS. 2 and 3, the toggle component 106 can receive a command signal either from the pushbutton switch 102 or from the mission processor 30 to toggle the state of the automated or hybrid switch device 100.

The method 200 can include causing, by the toggle component 106, a state of the bi-stable relay 104 to be flipped responsive to the input command signal from the at least one of the pushbutton switch or the processor (STEP 204). As discussed above with regard to FIGS. 2 and 3, the input command signal 124 (which represents a command 110 signal from the pushbutton switch 102 or a command signal 112 from the mission processor 30) can cause a state of the toggle component 106 (e.g., a state of the toggle relay 120) to flip, which in turn causes a flip in the state of the primary or bi-stable relay 104. For instance, the toggle component 106 can include the non-latching relay 122 and the second bi-stable relay 120. The method 200 can include receiving, by the non-latching switch 122, the input command signal 124 from the at least one of the pushbutton switch 102 or the processor 30, and causing, by the non-latching switch 122, a state of the second bi-stable relay to be flipped responsive to the input command signal 124 from the at least one of the pushbutton switch or the processor. Causing the state of the second bi-stable relay to be flipped can include energizing the one or more inductors 130 of the second bi-stable relay 120.

Causing the state of the first bi-stable relay 104 to be flipped can include energizing a first inductor (e.g., inductor 134*a*) of the bi-stable relay 104 that is different from a second inductor (e.g., inductor 134*b*) of the bi-stable relay 104 that was previously energized responsive to a second command signal preceding the first command signal. The state of the second bi-stable relay 120 does not change responsive to a failure or a power loss and is maintained until the next command signal is received. The change in the state of the second bi-stable relay 120 with each new command signal results in alternately energizing a different inductor of the bi-stable relay 104 with each new command. Each inductor 134*a* or 134*b* of the bi-stable relay 104 when energized flips the state of the bi-stable relay 104.

The method 200 can include maintaining, by the bi-stable relay 104, the state of the bi-stable relay until a subsequent input command signal is received by the toggle component 106 from the at least one of the pushbutton switch 102 or the processor 30 (STEP 206). The energized inductor 134*a* or 134*b* of the bi-stable array 104 can cause the new state of the bi-stable array 104 to be maintained until the next command signal is received. The bi-stable relay can be connected to and can control operation of one or more systems of an aircraft.

In some implementations, the pushbutton switch 102 can be a momentary pushbutton switch and the method 200 can further include switching, by the pushbutton switch 102, to a closed position when the pushbutton switch is actuated by a user, and switching back, by the pushbutton switch 102, to an open position when the pushbutton switch is released by the user. In some implementations, the state of the bi-stable relay does not change responsive to a failure or a power loss. The bi-stable relay 104 can include a four-pole double throw switch. The method 200 can further include transmitting, by the bi-stable relay 104, a feedback signal 118 indicative of the state of the bi-stable relay 104 to the processor 30.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A cockpit switch device comprising: a pushbutton switch configured to be manually actuated by a user into a command state; a bi-stable relay controlled by input commands from the pushbutton switch and input commands from a processor, the bi-stable relay configured to control operation of one or more aircraft systems; and a toggle component connected to the pushbutton switch, the processor and the bi-stable relay, the toggle component configured to: receive an input command signal from at least one of the pushbutton switches or the processor; and cause a State of the bi-stable relay to be flipped responsive to the input command signal from the at least one of the pushbutton switches or the processor, wherein the bi-stable relay is a first bi-stable relay and the toggle component includes a non-latching relay and a second bi-stable relay, the non-latching relay configured to: receive the input command signal from the at least one of the pushbutton switches or the processor; and cause a State of the second bi-stable relay to be flipped responsive to the input command signal from the at least one of the pushbutton switches or the processor.

2. The cockpit switch device of claim 1, wherein the pushbutton switch is a momentary pushbutton switch.

3. The cockpit switch device of claim 2, wherein the pushbutton switch includes a mechanical switch structured to:
switch to a closed position when the pushbutton switch is actuated by the user; and
switch back to an open position when the pushbutton switch is released by the user.

4. The cockpit switch device of claim 1, wherein the second bi-stable relay includes one or more inductors and the non-latching relay is configured to cause the state of the second bi-stable relay to be flipped by energizing the one or more inductors of the second bi-stable relay.

5. The cockpit switch device of claim 1, wherein the input command signal is a first command signal, the first bi-stable relay includes a pair of inductors, and the second bi-stable relay is configured to cause the state of the first bi-stable relay to be flipped by energizing a first inductor of the first bi-stable relay that is different than a second inductor of the first bi-stable relay that was previously energized responsive to a second command signal preceding the first command signal.

6. The cockpit switch device of claim 1, wherein the state of the second bi-stable relay does not change responsive to a failure or a power loss.

7. The cockpit switch device of claim 1, wherein the state of the bi-stable relay does not change responsive to a failure or a power loss.

8. The cockpit switch device of claim 1, wherein the bi-stable relay includes a four-pole double throw switch.

9. The cockpit switch device of claim 1, wherein the bi-stable relay is configured to transmit a feedback signal indicative of the state of the bi-stable relay to the processor.

10. A method comprising: receiving, by a toggle component connected to a pushbutton switch, a processor and a bi-stable relay, an input command signal from at least one of the pushbutton switch or the processor; causing, by the toggle component, a state of the bi-stable relay to be flipped responsive to the input command signal from the at least one of the pushbutton switch or the processor; maintaining, by the bi-stable relay, the state of the bi-stable relay until a subsequent input command signal is received by the toggle component from the at least one of the pushbutton switches or the processor, the bi-stable relay configured to control operation of one or more systems of an aircraft; receiving, by a non-latching switch, the input command signal from the at least one of the pushbutton switches or the processor; and causing, by the non-latching switch, a state of the second bi-stable relay to be flipped responsive to the input command signal from the at least one of the pushbutton switches or the processor, wherein the bi-stable relay is a first bi-stable relay and the toggle component includes the non-latching switch and a second bi-stable relay.

11. The method of claim 10, further comprising:
switching, by the pushbutton switch, to a closed position when the pushbutton switch is actuated by a user; and
switching back, by the pushbutton switch, to an open position when the pushbutton switch is released by the user.

12. The method of claim 10, wherein the second bi-stable relay includes one or more inductors and wherein causing the state of the second bi-stable relay to be flipped includes energizing the one or more inductors of the second bi-stable relay.

13. The method of claim 10, wherein the input command signal is a first command signal and the first bi-stable relay includes a pair of inductors, and wherein causing the state of the first bi-stable relay to be flipped includes energizing a first inductor of the first bi-stable relay that is different from a second inductor of the first bi-stable relay that was previously energized responsive to a second command signal preceding the first command signal.

14. The method of claim 10, wherein the state of the second bi-stable relay does not change responsive to a failure or a power loss.

15. The method of claim 10, wherein the state of the bi-stable relay does not change responsive to a failure or a power loss.

16. The method of claim 10, wherein the bi-stable relay includes a four-pole double throw switch.

17. The method of claim 10, further comprising transmitting, by the bi-stable relay, a feedback signal indicative of the state of the bi-stable relay to the processor.

* * * * *